(12) United States Patent
Tsai et al.

(10) Patent No.: US 7,151,842 B2
(45) Date of Patent: Dec. 19, 2006

(54) WATERMARK EMBEDDING AND EXTRACTING METHOD AND EMBEDDING HARDWARE STRUCTURE USED IN IMAGE COMPRESSION SYSTEM

(75) Inventors: Tsung-Han Tsai, Jungli (TW); Chorun-Yi Lu, Tao-yuang (TW)

(73) Assignee: National Central University, TAoyuan Hsien (TW)

( * ) Notice: Subject to any disclaimer, the term of this patent is extended or adjusted under 35 U.S.C. 154(b) by 0 days.

(21) Appl. No.: 11/233,603

(22) Filed: Sep. 22, 2005

(65) Prior Publication Data

US 2006/0039582 A1    Feb. 23, 2006

Related U.S. Application Data

(62) Division of application No. 10/104,281, filed on Mar. 20, 2002, now Pat. No. 6,993,151.

(51) Int. Cl.
*H04K 1/00* (2006.01)

(52) U.S. Cl. .................................. 382/100; 382/250

(58) Field of Classification Search ................ 382/100, 382/232, 250, 251; 380/287, 54; 713/176
See application file for complete search history.

(56) References Cited

U.S. PATENT DOCUMENTS

2001/0009581 A1 * 7/2001 Hashimoto .................. 380/205
2001/0010729 A1 * 8/2001 Kamijoh et al. ............ 382/100

OTHER PUBLICATIONS

Chung et al., "Digital Watermarking for Copyright Protection of MPEG2 Compressed Video," IEEE Transactions on Consumer Electronics, vol. 44, No. 3, Nov. 1998, pp. 895-901.*
Kiya et al., "A Method of Inserting Binary Data into MPEG Video in the Compressed Domain," IEICE Trans. Fundamentals, vol. E82-A, No. 8, Aug. 1999, pp. 1485-1492.*
Dugad et al., "A Scheme for Joint Watermarking and Compression of Video," IEEE Proc. 2000 Int. Conf. on Image Processing, vol. II, Sep. 2000, pp. 80-83.*
Wong et al., "A Data Hiding Technique in JPEG Compressed Domain," Proc. SPIE vol. 4314: Security and Watermarking of Multimedia Contents III, Jan. 2001, pp. 309-319.*
Choi et al., "Watermarking Using Inter-Block Correlation: Extension to JPEG Coded Domain," IEICE Trans. Fundamentals, vol. E84-A, No. 3, Mar. 2001, pp. 893-897.*
Fridrich et al., "Invertible Authentication Watermark for JPEG Images," IEEE Proc. Int. Conf. on Information Technology: Coding and Computing, Apr. 2001, pp. 223-227.*

* cited by examiner

*Primary Examiner*—Andrew W. Johns
(74) *Attorney, Agent, or Firm*—J.C. Patents

(57) ABSTRACT

A watermark and extracting method and a watermark hardware structure used in an image compression system. A series of data is generated by random variables, such that duplication is avoided. According to characteristics of the human vision system, weighted value of each block is analyzed by classification in the frequency domain. According to the specific weighted value for each block, a watermark intensity is embedded, such that the embedded watermark is not easily observed, while the robustness is retained. Therefore, the original figure is not required for extraction. In addition, the watermark embedding hardware structure can be incorporated in a joint photographic experts group (JPEG) system, so that the image itself contains the watermark data while being intercepted.

8 Claims, 4 Drawing Sheets

WATERMARK EMBEDDING AND EXTRACTING METHOD AND EMBEDDING HARDWARE STRUCTURE USED IN IMAGE COMPRESSION SYSTEM

CROSS-REFERENCE TO RELATED APPLICATION

This application is a divisional application of, and claims the priority benefit of, U.S. application Ser. No. 10/104,281 filed on Mar. 20, 2002, now U.S. Pat. No. 6,993,151, which claims the priority benefit of Taiwan application serial no. 91101230, filed Jan. 25, 2002.

SCENARIO OF THE INVENTION

1. Field of the Invention

The present invention relates in general to a watermark, and more particularly, to a watermark embedding and extracting method and a watermark embedding hardware structure used in an image compression system.

2. Description of the Related Art

In recent years, many corporations and enterprises have applied the Internet to commercial activities for business promotion. The activities include, for example, electronic shopping, on-line broadcast, on-line filming, and electronic document. A great convenience has been obtained for both the enterprises and the customers. However, problems regarding information security such as allonym transaction, embezzlement, abstraction and interpolation occur. Many of these problems can be resolved by encryption technique. However, copyright approval and inspection problems for the network transmission of valuable medium (such as image, film and music) have to be overcome. Lately, as digital cameras and scanners have become popular, the digitized photograph has become widely distributed over the network. Such a broad distribution results in interpolation and appropriation problems for the photographs, and copyright problems thus occur. The watermark is one of the methods to resolve such problems.

The hidden watermark is applied based on the distortability characteristic of the digital medium, that is, minor modification of digital data does not result in significant effect for sensory perception of human beings. The watermark technique is categorized into a spatial domain and a frequency domain. In the spatial domain, digital data value is directly changed to embed the watermark. Such a method has the advantage of fast operation speed, but it is difficult to resist damage caused by various type of signal process. In the frequency domain, the digital data is transformed into a frequency domain, using Fourier transformation, discrete cosine transformation (DCT), or wavelet transformation, for example. After transformation, the obtained coefficient is used to embed the watermark, which is then converted to the previous spatial domain. The method requires a huge operation, but has a better capability to resist noise processing damage.

The above conventional watermark embedding technique is achieved by software processing. As the watermark embedment requires a huge operation, a complex program is required. Thus, the load on the system is increased, and the performance thereof is affected.

SUMMARY OF THE INVENTION

The invention provides a watermark embedding and extracting method and a watermark embedding hardware structure used in an image compression system. By executing watermark embedment via the watermark embedding hardware structure, the image itself contains the watermark data after image compression, therefore, the performance of the whole system is enhanced.

The watermark embedding method used in the image compression system comprises partitioning an original image into several sub-image blocks. Each of the sub-image blocks $B_k$ (k=1, 2, 3, ..., n, and n is a positive integer) has an 8×8 dimension. A discrete cosine transformation is performed on each of the sub-image blocks $B_k$. A texture analysis and a luminance analysis are performed on each sub-image block by classification to generate analysis data. According to the analysis data, each sub-image block is divided into three levels.

When number$\{\text{int}F_k(u,v)/Q_k(u,v))\neq 0\} < T_2$ and $F_k(0,0) < T_1$, the sub-image block $B_k$ is defined as level 1 that indicates darker luminance and insignificant texture characteristics.

When number$\{\text{int}F_k(u,v)/Q_k(u,v))\neq 0\} > T_2$ and $F_k(0,0) > T_1$, $B_k$ is defined as class 3 that indicates brighter luminance and significant texture characteristics.

When $B_k$ is neither class 1 nor class 3, it is defined as class 2 that indicates luminance and texture characteristics between levels 1 and 3.

In the above relationships, $F_k(0,0)$ indicates the low frequency value (DC) obtained by performing a discrete cosine transformation on each sub-image block $B_k$, and $F_k(u,v)$ indicates the high frequency value (AC) obtained by performing discrete cosine transformation on each sub-image block $B_k$, where u, v≠0. Q(u,v) is the quantized value, $T_1$ is the low frequency value, and $T_2$ is the non-zero number in high frequency. According to the analysis value, the image characteristic for each sub-image block is determined, and a corresponding weighted value $\alpha_k$ is given. A multiplication for the weighted value and a watermark value is obtained. The data $F_k^*$ of the watermark embedded into each sub-image block corresponding to a fixed position of the sub-image block is derived from the following equation (1).

$$\begin{cases} F_k(u,v) + (\alpha_k \times x_i), 3k < i < (3k+1), & (u,v) \in \{(0,1), (1,0), (1,1)\} \\ F_k(u,v), & \text{others} \end{cases} \quad (1)$$

where $x_i$ is the embedded watermark value. The embedded watermark value is then quantized and encoded to generate a standard JPEG file.

The invention further provides a watermark extracting method used in an image compression system. The image to be tested $X^*$ is partitioned into several sub-image blocks with a dimension of 8×8. The discrete cosine transformation is performed on each sub-image block to obtain several data. A zigzag encoding process is performed to sort the data from low frequency to high frequency. A watermark signal energy $W^*$ is extracted at the position where the embedded watermark is. The relationship of $Z = W \times W^*/M$ is applied to obtain the correlated value Z of the watermark contained in the image to be tested $X^*$. Z is the correlated value of the watermark contained in the image to be tested $X^*$, W is the value of the embedded watermark, and M is the quantity of the embedded watermark. When the correlated value Z is larger than a critical value $S_z$, whether the image to be tested $X^*$ contains watermark is determined. The critical value $S_z$ can be expressed by $$S_z = \frac{\overline{\alpha}}{3M} \sum_{i=1}^{M} W_i^*,$$

where $\overline{\alpha}$ is an average weighted value.

The invention further provides a watermark embedding hardware structure, having a discrete cosine transformation register, a quantization table ROM, a first and a second comparator, a first and a second register, a multiplier and an adder. The discrete cosine transformation register is used to store the data obtained by discrete cosine transformation. The quantization table ROM is used to store the quantized values. The first comparator coupled to the quantization table ROM receives and compares the data and the quantized values, and outputs the quantized values. The first register is used to store a first configuration value. The second register is used to store a second configuration value. The second comparator is coupled to the first comparator and the first and second registers to receive and compare the quantized data, the first and second configuration values, so as to output a weight value corresponding to each quantized value. The multiplier is coupled to the second comparator to receive the weighted values and the watermark values. The weighted values are multiplied by the watermark values to output the embedded watermark value. The adder is coupled to the discrete cosine transformation register and the multiplier to receive the embedded watermark values and the data to be embedded with the embedded watermark values. The data is added to the embedded watermark data to output the embedded watermark data. In addition, the embedded watermark data is stored in the discrete cosine transformation and output thereby.

The invention further comprises another watermark embedding hardware structure, comprising a discrete cosine transformation register, a classification detection system, and a watermark embedding apparatus. The discrete cosine transformation register is used to store the data obtained by discrete cosine transformation. The classification detection system is coupled to the discrete cosine transformation register to receive the data, and to output a weighted value, which is generated by a weighted value generator corresponding to each of the data. The watermark embedding apparatus is coupled to the classification detection system and the weighted value generator to receive the weighted values and the watermark values. The weighted values are then multiplied with the watermark values to obtain an embedded watermark value, which is then added with the data to obtain the embedded watermark data, output by the classification detection system. In addition, the embedded watermark data is stored in the discrete cosine transformation register and output thereby.

According to the above, the embedment of watermark executed by the watermark embedding hardware structure provided by the invention allows the image to contain the watermark data therein after image compression, so that the system performance is enhanced. In addition, the watermark embedding hardware structure can be combined with the joint photographic experts group (JPEG) system, and is applicable to image compression systems for digital cameras or scanners.

Both the foregoing general description and the following detailed description are exemplary and explanatory only and are not restrictive of the invention, as claimed.

DESCRIPTION OF THE PREFERRED EMBODIMENTS

Figure 1:
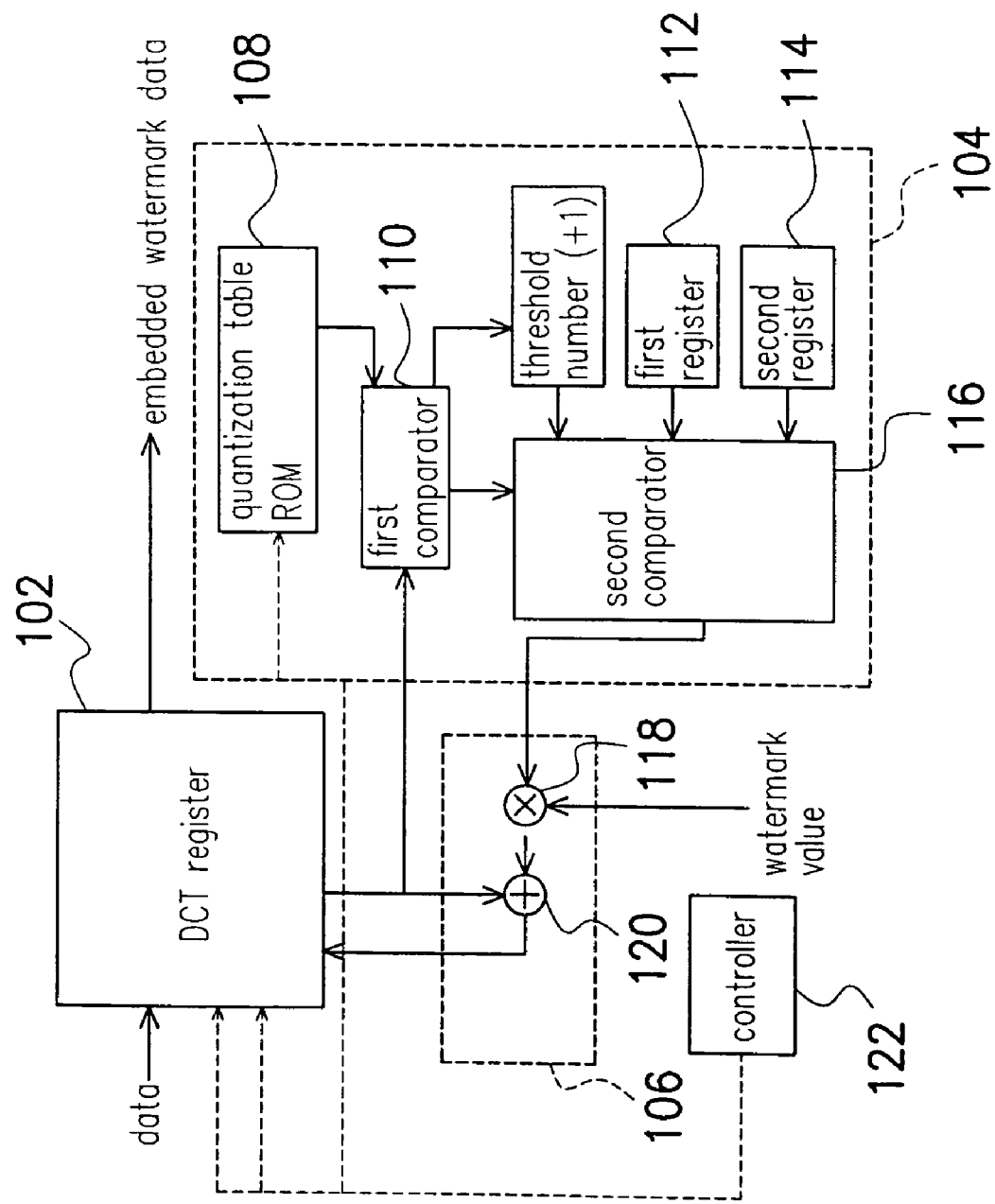
FIG. 1 shows an embodiment of a watermark embedding hardware structure used in an image compression system in the invention.

Referring to FIG. 1, a preferred embodiment of a watermark embedding hardware structure used in an image compression system according to the invention is shown. The embedding hardware structure comprises a discrete cosine transformation (DCT) register 102, a classification detection system 104, and a watermark embedding apparatus 106. The functions for each of the above elements are described as follows.

The DCT register 102 is used to store several data obtained after the discrete cosine transformation. In this embodiment, the DCT register 102 has 64×12bits.

The classification detection system 104 comprises a quantization table ROM 108, a first comparator 110, a first register 112, a second register 114, and a second comparator 116. The quantization table ROM 108 is used to store several quantization values. The first comparator 110 is used to receive the data and the quantization values. The first register 112 is used to store a first configuration value. The second register 114 is used to store a second configuration value. The second comparator is used to receive and compare the quantization values, the first and second configuration values, and to output the weighted value $\alpha_k$ corresponding to each of the quantization values. In addition, the weighted value $\alpha_k$ is generated by a weighted value generator (not shown).

The watermark embedding apparatus 106 comprises a multiplier 118 and an adder 120. The multiplier 118 receives the weighted values $\alpha_k$ and a watermark value, so as to output an embedded watermark value obtained by multiplying the weighted values $\alpha_k$ and the watermark value. The adder 120 receives the embedded watermark value and adds the data with the embedded watermark data to output embedded watermark data, which is then stored in and output by the DCT register 102.

Figure 2:
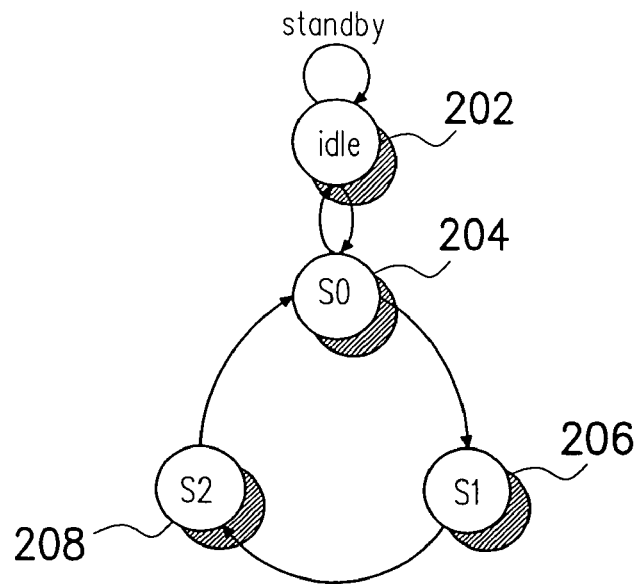
FIG. 2 shows a watermark control process flow of an watermark embedding hardware structure used in an image compression system according to a preferred embodiment of the invention.

The whole control process for embedding watermark is completed using an internal control unit 122 as shown in FIG. 2. The whole control process is divided into four states, that is, an idle state 202, an S0 state 204, an S1 state 206 and an S2 state 208. The idle state 202 lasts until receiving a DCT complete signal. While receiving the DCT complete signal that indicates the completion of the discrete cosine transformation in the DCT module, the S0 state is entered. In S0 state, the data obtained by transformation is input and stored to the DCT register 102, and the weighted values $\alpha_k$ are obtained. The S1 state is then entered to execute the embedding function of the watermark. The S2 state is then entered to output the embedded watermark data obtained by the watermark embedding function. The system then enters the idle state 202 again and standby for the next DCT complete signal.

Figure 3:
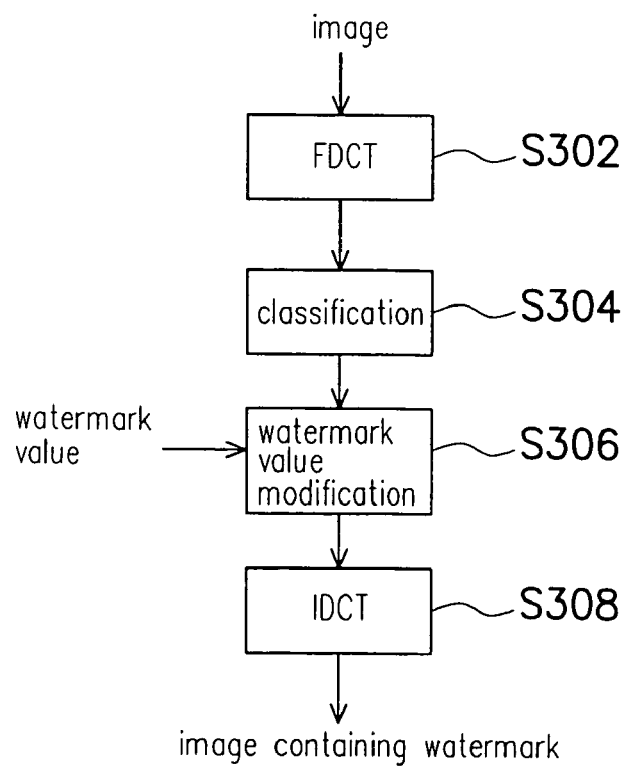
FIG. 3 shows an embodiment of a watermark embedding process flow applied to an image compression system.

According the process flow for watermark embedment used in an image compression system in one embodiment of the invention as shown in FIG. 3, an original image is partitioned into several sub-image blocks. Each sub-image block $B_k$ (k=1, 2, 3, ..., n, where n is a positive integer) has an 8×8 dimension. A forward discrete cosine transformation (FDCT) is performed on each sub-image in step s302. Texture and luminance analysis is performed on each sub-image block to obtain an analysis value. According to the analysis value, each sub-image block can be divided into three levels.

When number$\{intF_k(u,v)/Q_k(u,v))\neq 0\} < T_2$ and $F_k(0,0) < T_1$, the sub-image block $B_k$ is defined as class 1 that indicates darker luminance and insignificant texture characteristics.

When number$\{intF_k(u,v)/Q_k(u,v))\neq 0\} > T_2$ and $F_k(0,0) > T_1$, $B_k$ is defined as class 3 that indicates brighter luminance and significant texture characteristics.

When $B_k$ is neither class 1 nor class 3, $B_k$ is defined as class 2 that indicates luminance and texture characteristics between class 1 and class 3.

In the above relationships, $F_k(0,0)$ indicates the low frequency value (DC) obtained by performing a discrete cosine transformation on each sub-image block $B_k$, and $F_k(u,v)$ indicates the high frequency value (AC) obtained by performing a discrete cosine transformation on each sub-image block $B_k$, where u, v≠0. Q(u,v) is the quantized value, $T_1$ is a value in low frequency, and $T_2$ is the non-zero number in high frequency (step s304). According to the analysis value, the image characteristic for each sub-image block is determined, and a corresponding weighted value $\alpha_k$ is given. Multiplication of the weighted value and a watermark value is performed. The data $F_k^*$ of the watermark embedded into each sub-image block corresponding to a fixed position of the sub-image block is derived from the following equation (1).

$$F_k^* = \begin{cases} F_k(u, v) + (\alpha_k \times x_i), & 3k < i < (3k+1), (u, v) \in \{(0, 1), (1, 0), (1, 1)\} \\ F_k(u, v), & \text{others} \end{cases} \quad (1)$$

where $x_i$ is the embedded watermark value, which is a set of random variables ranged between +1 and −1 (as step s306). An inverse DCT (IDCT) is performed on the resultant watermark data $F_k^*$, and the standard JPEG file generated by quantization and encoding is obtained (step s308).

In addition, if each sub-image block belongs to class 1, the best image quality is obtained when the weighted value is 2 according to an empirical result. If each sub-image block belongs to class 2, the best image quality is obtained when the weighted value is 6 according to an empirical result. If each sub-image block belongs to class 3, the best image quality is obtained when the weighted value is 9 according to an empirical result. Further, the embedding method comprises a module added with a watermark and a module not added with a watermark, which results in the JPEG file with and without hidden watermark, respectively.

Figure 4:
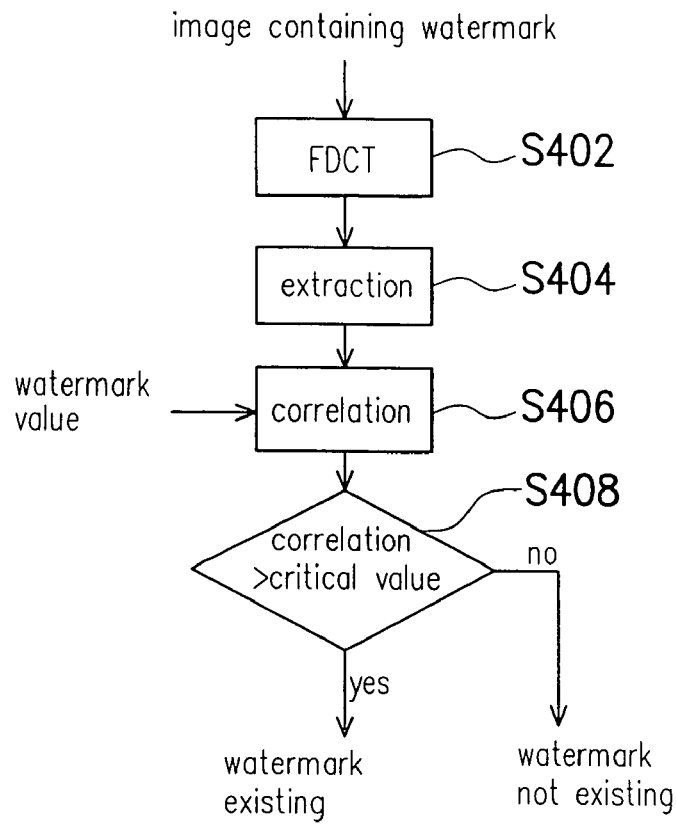
FIG. 4 shows an embodiment of a watermark extracting process flow applied to an image compression system.

FIG. 4 shows a watermark extracting process flow used in an image compression system according to one embodiment of the invention. An image to be tested X* is partitioned into several sub-image blocks with a dimension of 8×8. The discrete cosine transformation is performed on each sub-image block to obtain several data. A zigzag encoding process is performed to sort the data from low frequency to high frequency (step s402). A watermark signal energy W* is extracted at the position where the embedded watermark is (step s404). The relationship of Z=W×W*/M is applied to obtain the correlated value Z of the watermark contained in the image to be tested X*. Z is the correlated value of the watermark contained in the image to be tested X*, W is the value of the embedded watermark, and M is the quantity of the embedded watermark (step s406). When the correlated value Z is larger than a critical value $S_z$, whether the image to be tested X* contains a watermark is determined. The critical value $S_z$ can be expressed by $$S_z = \frac{\overline{\alpha}}{3M} \sum_{i=1}^{M} W_i^*,$$

where $\overline{\alpha}$ is an average weighted value.

When the correlated value Z is not larger than the critical value $S_z$, the image to be tested X* does not contain the watermark (step s408).

In addition, $$W^* = \sum_{k=1}^{n} W_k^*, W_k^* = F^*(u, v), (u, v) \in \{(0, 1), (1, 0), (1, 1)\}$$

where $F_k^*(u,v)$ is the embedded watermark data.

$$W = \sum_{i=1}^{3n} x_i,$$

where $x_i$ is the embedded watermark value, and M=3n. In addition, the extracting method does not require the storage of the original figure, so that it can be applied to detection of watermark.

Figure 5:
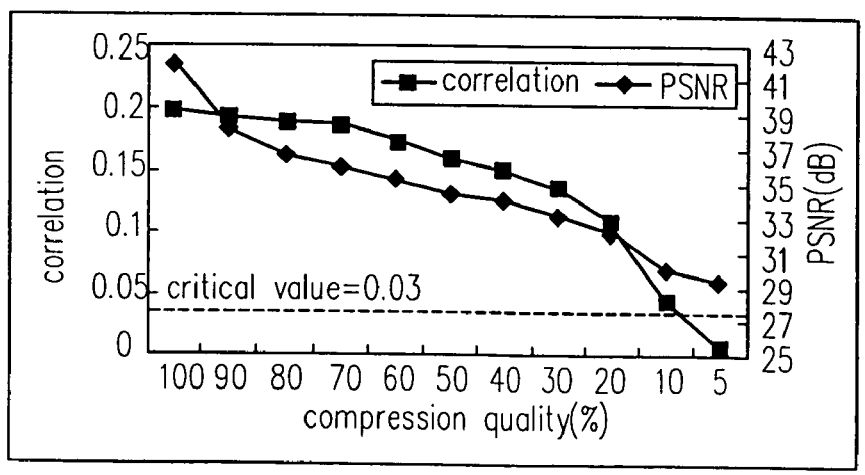
FIG. 5 shows the correlation and peak signal noise ratio under different compression ratio for a watermark embedding hardware structure used in an image compression system in one embodiment of the invention.

FIG. 5 shows a graph of correlation versus peak signal to noise ratio (PSNR) for an embedding hardware structure used in an image compression system under different compression ratios according to one embodiment of the invention. As shown in FIG. 5, when the percentage of compression quality is low, the correlation and PSNR are low. In contrast, the correlation and PSNR are high when the compression quality percentage is high.

Figure 6:
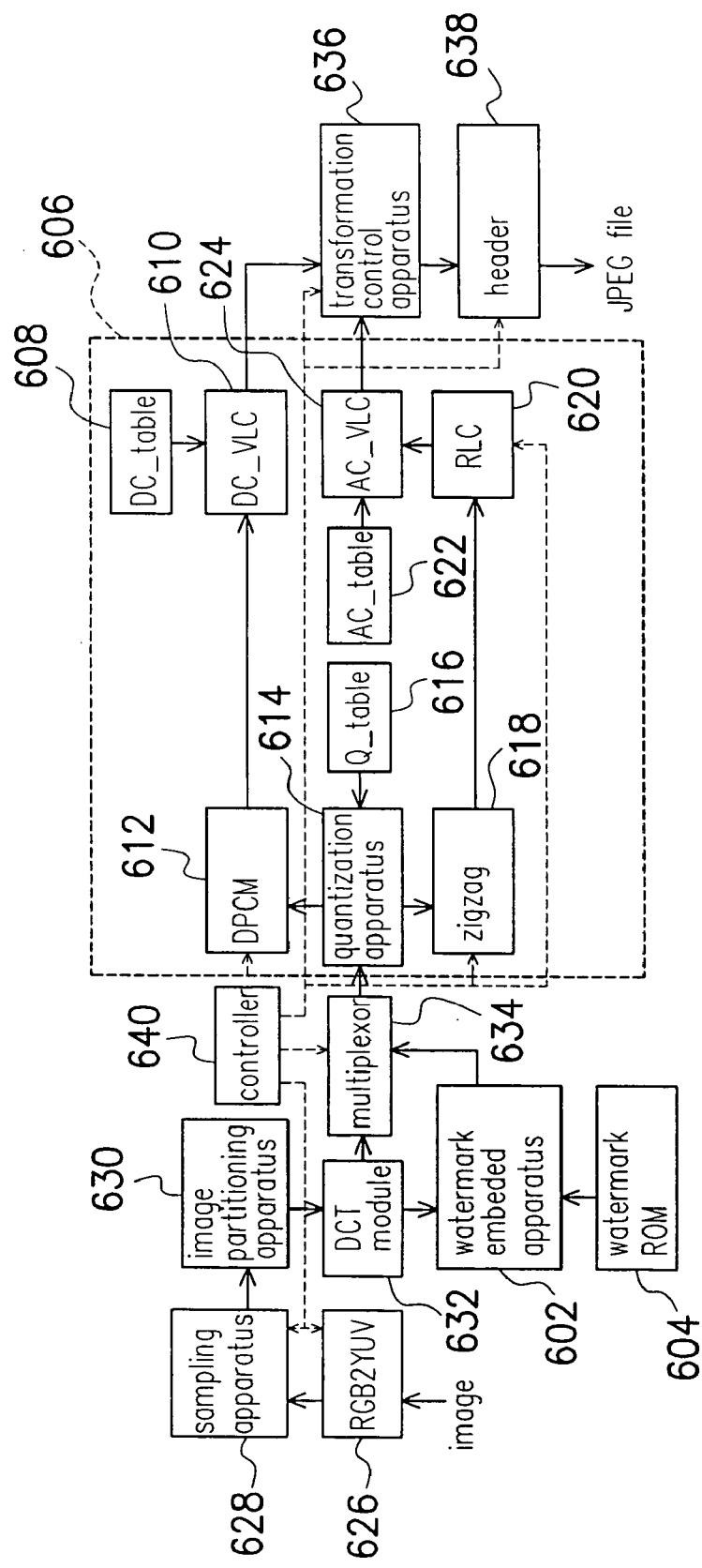
FIG. 6 shows combining a JPEG file with a watermark embedding hardware structure used in an image compression system in one embodiment of the invention.

Another embodiment of the invention provides a watermark embedding hardware structure that can be incorporated in a JPEG system. The combination of the watermark embedding hardware structure and the JEPG system is shown as FIG. 6. The watermark embedding structure 602 is a watermark embedding hardware structure used in an image compression system. The watermark value is stored in an watermark ROM. The JPEG system 606 comprises a low frequency table apparatus (DC_table) 608, a low frequency variable length coding apparatus (DC_VLC) 610, a difference program coding module (DPCM) 612, a quantization apparatus 614, a quantization table apparatus 616, a zigzag code sequence apparatus 618, an execution length converter (RLC) 620, a high frequency table apparatus (AC_table) 622, and a high frequency variable length coding apparatus (AC_VLC) 624. The operation of the system structure is described as follows.

Through a color image domain converter (RGB2YUV) 626, an image is sampled by a sampling apparatus 628. The sampled image is partitioned into 8×8 image blocks by an image partitioning apparatus. Each image block is processed with FDCT by a DCT module 632. The transformed image can select the watermark data provided by the watermark embedding apparatus 602 via a multiplexor 634. The output data of the multiplexor are then quantized and coded by the JPEG system 606. Through the transformation control apparatus 636 and the header 638, the JPEG file with watermark data is generated. Therefore, the invention incorporates a combination of the watermark embedding hardware structure into a JPEG system, which is applicable to an image compression system such as a digital camera and a scanner. Thereby, while an image is intercepted by the digital camera or the scanner, the image itself contains the watermark data, and the system performance is enhanced.

According to the above, the invention has the following advantages.

1. A hardware structure is used for embedding the watermark, so that the performance of the whole system is enhanced.

2. After image compression, the image itself contains watermark data.

3. The watermark hardware structure can be combined with the JPEG system.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A watermark embedding structure used in an image compression system, comprising:

a discrete cosine transformation register, to store a plurality of data obtained by discrete cosine transformation;

a quantization table ROM, to store a plurality of quantized values;

a first comparator, coupled to the quantization table ROM to receive the data and the quantized values and the data, and to compare the quantized values and the data to output a plurality of quantized data;

a first register, to store a first configuration value;

a second register, to store a second configuration value;

a second comparator, coupled to the first comparator, the first register, and the second register to receive the quantized data, the first and second configuration values, and to compare the quantized data, the first configuration value and the second configuration value to output a weighted value for each of the quantized data;

a multiplier, coupled to the second comparator to receive the weighted values and to multiply the weighted values with a watermark value to output an embedded watermark value; and an adder, coupled to the discrete cosine transformation register and the multiplier to receive and add the embedded watermark value and the data to output an embedded watermark data;

wherein the embedded watermark data is stored in the discrete cosine transformation register and then output thereby.

2. The structure according to claim 1, further comprising a controller coupled to the discrete cosine transformation register and the quantization table ROM to control a plurality of watermark embedding processes.

3. The structure according to claim 2, wherein each watermark embedding process comprises:

an idle state, waiting for a discrete cosine transformation complete signal, which indicates that the discrete cosine transformation has been complete;

a S0 state, to store the data into the discrete cosine transformation register and to obtain the weighted value;

a S1 state, to execute embedding the watermark value; and a S2 state, to output the embedded watermark data.

4. A watermark embedding hardware structure used in an image compression system, comprising:

a discrete cosine transformation register, to store a plurality of data which have been processed by a discrete cosine transformation module;

a classification detection system, coupled to the discrete cosine transformation register to receive the data, and using classification to output a weighted value corresponding to each of the data; and a watermark embedding apparatus, coupled to the classification detection system to receive the weighted value and a watermark value, and to multiply the weighted value and the watermark value to obtain an embedded watermark value, and receiving one of the data which is to be embedded with the embedded watermark value and adding the one of the data with the embedded watermark value to output an embedded watermark data;

wherein the embedded watermark data is stored in the discrete cosine transformation register and is then output thereby.

5. The hardware structure used according to claim 4, wherein the classification detection system comprising:

a quantization table ROM, to store a plurality of quantized values;

a first comparator, coupled to the quantization table ROM to receive the data and the quantized values, and to compare the data and the quantized values, so as to output a plurality of quantized data;

a first register, to store a first configuration value;

a second register, to store a second configuration value; and a second comparator, coupled to the first comparator, the first register and the second register to receive and compare the quantized data, the first and second configuration values, so as to output the weighted value corresponding to each of the quantized data.

6. The hardware structure according to claim 4, wherein the watermark embedding apparatus further comprises:

a multiplier, to receive and multiply the weighted value and the watermark value to output the embedded watermark value; and an adder, coupled to the discrete cosine transformation register and the multiplier to receive and multiply the embedded watermark value and the data to be embedded with the embedded watermark value, so as to output the embedded watermark data.

7. The hardware structure according to claim 4, further comprising a controller coupled to the discrete cosine transformation register and the quantization table ROM to control a plurality of watermark embedding processes.

8. The hardware structure according to claim 7, wherein each of the watermark embedding processes comprises:

an idle state, waiting for a discrete cosine transformation complete signal, which indicates completion of the discrete cosine transformation complete signal;

a S0 state, to store the data into the discrete cosine transformation register and to obtain the weighted values;

a S1 state, to executing embedding the watermark value; and a S2 state, to output the embedded watermark data.

* * * * *